J. W. A. CLUETT.

CUFFS

No. 7,878. Reissued Sept. 11, 1877.

Witnesses:
Chas. H. Searle
D. P. Cowl

J. W. A. Cluett,
Inventor:
By Wm. Alexander,
Attorney.

N. PETERS, PHOTO-LITHOGRAPHER, WASHINGTON, D. C.

UNITED STATES PATENT OFFICE.

J. W. ALFRED CLUETT, OF TROY, NEW YORK.

IMPROVEMENT IN CUFFS.

Specification forming part of Letters Patent No. 158,627, dated January 12, 1875; Reissue No. 7,878, dated September 11, 1877; application filed August 23, 1877.

*To all whom it may concern:*

Be it known that I, J. W. ALFRED CLUETT, of the city of Troy, county of Rensselaer, and State of New York, have invented certain new and useful Improvements in Cuffs and the art of making them, of which the following is a full, clear, and exact description.

This invention has relation particularly to that class of wearing apparel generally known as "false cuffs"—*i. e.*, to cuffs made separate from the sleeve—and the invention is applicable to any style of false cuffs for either gentlemen's or ladies' wear.

In the ordinary method of making these cuffs the fabric is cut in the desired shape, and of as many thicknesses as desired, one of these thicknesses or parts forming the front or face, one the back, and those remaining, (one or more,) the interlining. These several pieces are placed together wrong side out, and run or coarsely stitched together around three of the edges, and then turned right side out through the open or unstitched edge, called the "closing-edge." This closing-edge is then folded inward and stitched, which operation closes the cuff. In this manner of making the cuff the closing-edge, of course, cannot be run or stitched before turning. Consequently there is and must be greater width of material at the closing-edge than at the other edges, in order to prevent said closing-edge from raveling out. Further, the closing-edge, after having been stitched, will open as far back as the seam made in closing it, because it is not run up on the wrong side, while the remaining edges will not open, and if stitched on the edge to prevent it opening, then the stitching will not be uniform unless the remaining sides be stitched to correspond, which would add materially to the cost of manufacture; and, further, a raised cord, which is often stitched in the edge of the cuff for a more ornamental finish, cannot be placed at the closing-edge. Consequently a reversible cuff cannot be corded on all of its edges so that they will be uniform. Again, unless great care be taken in turning in the closing-edge of the cuff, and skilled workmen employed to do it, the fabric will wrinkle in laundrying.

To obviate these numerous difficulties, and to diminish the cost of producing the manufactured article, are the objects of my invention.

Figure 1:
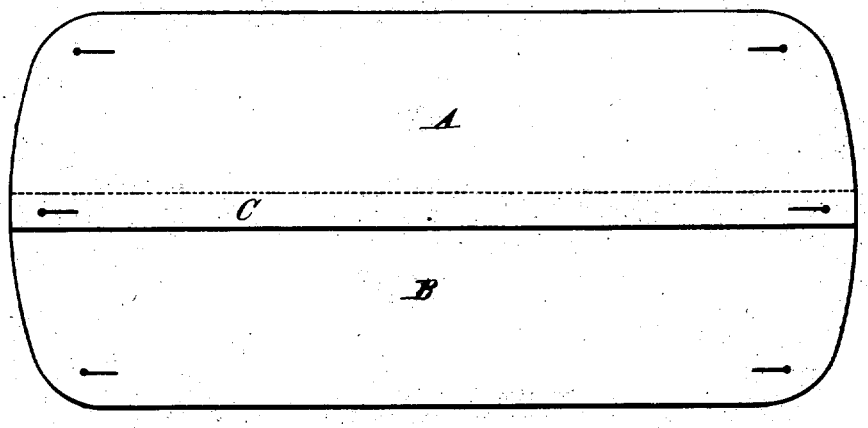
Figure 2:
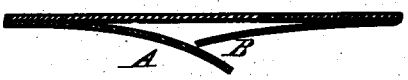

In the accompanying drawings, which form a part of this specification, Figure 1 is a plan view of the back of a cuff which has been finished in accordance with the principles of my invention. Fig. 2 is a sectional view of the same, representing the closing-seam unclosed.

A and B are the two parts of the back of the cuff to be closed in order to form the closing-seam.

The face of the cuff is cut in the usual manner; and in order that the pieces forming the cuff may be run or stitched entirely around before turning, and that the finishing line of stitches may confine the back along a folded edge of the cloth, whenever it may become desirable to confine the said back, the back is made in two parts, one being of such size that when folded in the center it will cover or make one half, or more or less, of the back of the cuff, and the other piece is so cut as that when folded in the center it will make the remaining part of the back.

A single back thus cut will make a three-ply cuff. If more thicknesses are desired, this back may be duplicated or other pieces added.

To make the cuff, these pieces are put together wrong side out, as in the ordinary manner, and are then run or stitched entirely around the cuff, thereby making the edges equal and uniform in appearance and in fact.

A cord or cords may also be stitched in entirely around the cuff. The cut edges of the pieces A and B are preferably seamed in with the edge of the front, and the folded edges left at the center for the final seam C.

After the cuff has been run or stitched entirely around it is turned right side out through the opening left in the material composing the back, and the final line of stitching to complete the article is run in close proximity to the folded edge in the back, which not only closes the opening, but makes an ornamental seam, largely enhancing the market value of the cuff.

In a reversible cuff the pieces A and B would be made of equal size, or so that the closing-seam would be through the middle; but it is obvious that these pieces may be so cut that the closing-seam would not be through the middle, but near one edge or end, and that it may be in the front instead of the back of the cuff.

If a row of stitching through the center of the cuff be undesirable in some particular style of cuff, it may be omitted, because in laundrying the lap of the edges of A and B will be united by the starch and the pressing sufficiently secure for wear, and as these edges are folded they will not ravel out.

The overlapping of a folded edge of one section of the back upon the remaining portion thereof affords an increased thickness of cloth or fabric at or near the location of the closing-seam, and this extra thickness serves as an additional foundation for said seam, as well as to give a trifling increased rigidity to the central line of the cuff.

Having thus fully described my invention, what I claim as new, and desire to secure by Letters Patent, is—

1. The method herein described of finishing a detachable or false cuff—that is to say, running or stitching the several parts together entirely around their edges when said parts are superposed and wrong side out, then turning the cuff right side out through an opening in one of the sides of the cuff, between the run or stitched edges, and then lapping one portion over upon the remaining portion, substantially as explained.

2. In a detachable or false cuff of the character herein specified, the combination, with the front or face thereof, of a back having a closing-seam between the edges of the cuff, substantially as and for the purpose explained.

3. A detachable cuff stitched or run entirely around its outer edge on the wrong side, and then turned right side out through an opening in the front or back, substantially as explained.

In testimony that I claim the foregoing I have hereunto subscribed my name in the presence of two witnesses.

J. W. ALFRED CLUETT.

Witnesses:

N. DAVENPORT,

E. H. G. CLARK.